United States Patent
Ray et al.

(10) Patent No.: US 11,620,108 B1
(45) Date of Patent: Apr. 4, 2023

(54) RANDOM NUMBER GENERATION SYSTEMS AND METHODS

(71) Applicants: Biswajit Ray, Madison, AL (US); Aleksander Milenkovic, Madison, AL (US)

(72) Inventors: Biswajit Ray, Madison, AL (US); Aleksander Milenkovic, Madison, AL (US)

(73) Assignee: Board of Trustees of the University of Alabama for and on behalf of the University of Alabama in Huntsville, Huntsville, AL (US)

(*) Notice: Subject to any disclaimer, the term of this patent is extended or adjusted under 35 U.S.C. 154(b) by 52 days.

(21) Appl. No.: 16/415,774

(22) Filed: May 17, 2019

Related U.S. Application Data (60) Provisional application No. 62/672,992, filed on May 17, 2018.

(51) Int. Cl.
*G06F 7/58* (2006.01)

(52) U.S. Cl.
CPC .................... *G06F 7/588* (2013.01)

(58) Field of Classification Search
CPC .......................... G06F 7/588; G06F 7/58–586
USPC ................................................. 708/250–256
See application file for complete search history.

(56) References Cited

U.S. PATENT DOCUMENTS

| | | | |
|---|---|---|---|
| 7,035,964 B1 | 4/2006 | Kohler | |
| 7,136,303 B2 | 11/2006 | Smith | |
| 7,491,948 B2 | 2/2009 | Gordon et al. | |
| 8,199,590 B1 | 6/2012 | Novosel | |
| 8,331,128 B1 | 12/2012 | Derhacobian | |
| 8,335,098 B2 | 12/2012 | Shen | |
| 8,861,250 B1 | 10/2014 | Wu | |
| 9,530,512 B2 | 12/2016 | Ray et al. | |
| 9,543,028 B2 | 1/2017 | Ray et al. | |
| 9,705,320 B1 | 7/2017 | Petrick | |
| 10,403,366 B1 | 9/2019 | Tabrizi | |
| 10,509,132 B1 | 12/2019 | Ray et al. | |
| 10,878,922 B1 | 12/2020 | Ray | |
| 11,101,009 B1 | 8/2021 | Ray | |
| 11,164,642 B1 | 11/2021 | Ray et al. | |

(Continued)

OTHER PUBLICATIONS

Y. Wang, W. Yu, S. Wu, G. Malysa, G. E. Suh and E. C. Kan, "Flash Memory for Ubiquitous Hardware Security Functions: True Random Number Generation and Device Fingerprints," 2012 IEEE Symposium on Security and Privacy, San Francisco, CA, 2012, pp. 33-47, doi: 10.1109/SP.2012.12. (Year: 2012).*

(Continued)

*Primary Examiner* — Emily E Larocque
*Assistant Examiner* — Carlo Waje
(74) *Attorney, Agent, or Firm* — Maynard Cooper & Gale, P.C.; Jon E. Holland (57) ABSTRACT

A random number generation system may generate one or more random numbers based on the repeated programming of a memory, such as a flash memory. As an example, a control system may repeatedly store a sequence to a block of flash memory to force a plurality of cells into a random state such that, at any given instant, the values in the cells may be random. The control system may identify which of the cells contain random values and then generate based on the identified values a number that is truly random.

9 Claims, 5 Drawing Sheets

(56) References Cited

U.S. PATENT DOCUMENTS

| | | |
|---|---|---|
| 2004/0041197 A1 | 3/2004 | Jong et al. |
| 2004/0191989 A1 | 9/2004 | Ngo |
| 2006/0083060 A1 | 4/2006 | Riva Reggiori |
| 2008/0232162 A1 | 9/2008 | Kuan |
| 2009/0165086 A1* | 6/2009 | Trichina ............... G06F 7/588 726/2 |
| 2010/0140488 A1 | 6/2010 | Visconti |
| 2010/0240156 A1 | 9/2010 | Suhail |
| 2014/0026653 A1 | 1/2014 | Del Signore et al. |
| 2014/0037086 A1* | 2/2014 | Seol ................. H04L 9/0869 380/44 |
| 2014/0098605 A1 | 4/2014 | Long |
| 2014/0146607 A1* | 5/2014 | Nagai ................. G06F 7/58 365/185.04 |
| 2015/0095550 A1* | 4/2015 | Khan ................. G06F 7/582 711/103 |
| 2015/0169247 A1* | 6/2015 | Wang ................. G06F 7/582 711/103 |
| 2015/0193204 A1* | 7/2015 | Lin ................. G06F 7/588 708/250 |
| 2015/0268934 A1* | 9/2015 | Anderson ............ G06F 7/582 708/250 |
| 2017/0032843 A1* | 2/2017 | Ilani ................. G11C 29/36 |
| 2017/0046129 A1* | 2/2017 | Cambou ............ H04L 9/0866 |
| 2017/0090873 A1* | 3/2017 | Clark ................. G06F 7/588 |
| 2017/0110199 A1 | 4/2017 | Li |
| 2017/0269992 A1* | 9/2017 | Bandic ............. G06F 11/108 |
| 2018/0287793 A1* | 10/2018 | Khatib Zadeh .... G11C 13/0004 |
| 2019/0294500 A1* | 9/2019 | Hara ................. H03M 13/2909 |
| 2020/0081689 A1* | 3/2020 | Huang ................. G06F 21/62 |
| 2020/0204367 A1* | 6/2020 | Miller ................. G11C 16/26 |

OTHER PUBLICATIONS

B. Ray and A. Milenković, "True Random Number Generation Using Read Noise of Flash Memory Cells," in IEEE Transactions on Electron Devices, vol. 65, No. 3, pp. 963-969, Mar. 2018, doi: 10.1109/TED.2018.2792436. (Year: 2018).*

P. Poudel, B. Ray and A. Milenkovic, "Microcontroller TRNGs Using Perturbed States of NOR Flash Memory Cells," in IEEE Transactions on Computers, vol. 68, No. 2, pp. 307-313, Feb. 1, 2019, doi: 10.1109/TC.2018.2866459. (Year: 2019).*

"Why do most of the non-volatile memories have logical 1 as the default state?" Retrieved on [Aug. 19, 2021]. Retrieved from the Internet <https://electronics.stackexchange.com/questions/179701/why-do-most-of-the-non-volatile-memories-have-logical-1-as-the-default-state> (Year: 2015).*

Prabhu, Pravin et al. "Extracting Device Fingerprints from Flash Memory by Exploiting Physical Variations." TRUST (2011). (Year: 2011).*

Irom, et al, "Single Event Effect and Total Ionizing Dose Results of Highly Scaled Flash Memories," Radiation Effects Data Workshop (REDW), 2013 IEEE, pp. 1-4, Jul. 2013.

* cited by examiner

RANDOM NUMBER GENERATION SYSTEMS AND METHODS

CROSS REFERENCE TO RELATED APPLICATION

This application claims priority to U.S. Provisional Application No. 62/672,992, entitled "Flash Memory based Random Number Generation" and filed on May 17, 2018, which is incorporated herein by reference.

RELATED ART

Many modern computer systems generate and process sensitive data. In such systems, communication needs to be secure and prevent interception of sensitive data by unauthorized recipients.

Data encryption is one technique that is often used to protect sensitive data. Data encryption algorithms and other types of algorithms for securing and protecting sensitive data often use one or more randomly generated numbers. To enhance the security of the information being protected, it is desirable for the random numbers generated for these data encryption and other algorithms to be truly random. Random number generators are often used in computer systems to generate random cryptographic keys used for encryption and many other applications where randomization and fairness are required, e.g., in electronic gambling, statistical sampling, computer simulation, and video games.

Unfortunately, the numbers generated by many conventional random number generators are not always truly random. That is, the algorithms used to generate the random numbers are often deterministic such that the generated numbers are actually pseudo-random, thereby making such numbers more susceptible to hacking attempts. If a hacker or other unauthorized user is able to recover a random number used in an encryption algorithm, it is more likely that the hacker or other unauthorized user will be able to break the encryption and recover the protected data. To help protect against this risk, many random number generators capable of generating numbers that are truly random have been developed, but these random number generators are often complex and expensive. In addition, these random number generators often use certain highly-random seed values that are not always available in certain applications. Moreover, better techniques for generating random numbers for various applications are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for generating random numbers. In an exemplary embodiment, a random number generation system may generate one or more random numbers based on the repeated programming of a memory, such as a flash memory. In an exemplary embodiment, a control system may repeatedly store a sequence to a block of flash memory to force a plurality of cells into a random state such that, at any given instant, the values in the cells are random. The control system may be configured to identify which of the cells contain random values and then generate based on the identified values a number that is truly random (i.e., not deterministic).

As mentioned earlier, many conventional random number generators capable of generating truly random numbers are relatively complex requiring dedicated hardware for random number generation. For space-constrained and resource-constrained systems, such as Internet-of-Things (IOT) devices, for example, accommodating additional hardware resources for generating random numbers may not be feasible or desirable. Further, deployment of the existing random number generators may require changes in design of the systems, thereby increasing associated redesign costs, and may undesirably increase complexity of the system. On the other hand, exemplary random number generation systems, as disclosed herein, may leverage the existing flash memory, used in many modern systems, in order to decrease its space and cost requirements.

As known in the art, flash memory is a commonly used medium for data storage. Flash memory uses a dielectric substrate and oxide layers to form memory cells. Each cell has a substrate with drain and source terminals and two gates, a control gate and a gate known as a "floating gate." The floating gate is surrounded by oxide and placed between the control gate and a channel in the substrate that connects the drain and source. Charge can be provided to the floating gate by applying a voltage differential to lines across the cell. A binary bit value of a cell's charge (e.g., voltage) can be determined by measuring the voltage differential across the cell. When a cell has a voltage value that exceeds a voltage threshold, the cell may be said to be "charged." When a cell is charged, it may be assigned a binary bit value of zero. When the voltage differential measured in a cell falls below a threshold, the cell may be said to be "uncharged" or "erased." When a cell is uncharged, it may be assigned a binary bit value of one.

Figure 1:
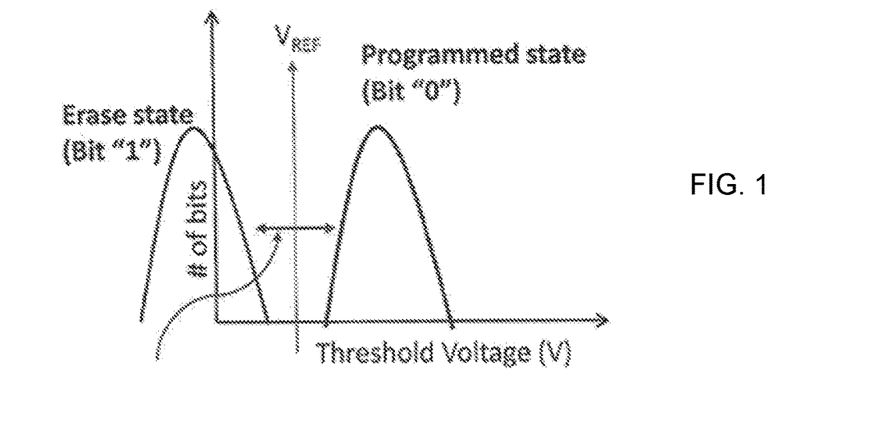
FIG. 1 is a graphical representation depicting a programmed state voltage and an erasable state of a plurality of cells of a flash memory.

In some flash memory architectures, multiple flash cells can be programmed or erased by providing voltage to a word line shared by the cells. A single-level-cell (SLC) architecture has a single binary value stored to each cell. Typically, in such architectures, a flash memory cell has sufficient margin between the threshold voltage at which the cell is considered programmed (e.g., logic value zero) and the threshold voltage at which the cell is considered uncharged (e.g., logic value one) to permit reading the cell's value, as depicted by FIG. 1. For example, when a sensing current is provided to the cell, the voltage value read based on the sensing current is indicative of the actual state of the memory cell (e.g., programmed or erased, logic value zero or one). In this regard, the margin present between programmed state voltage and erased state voltage for a flash memory cell is sufficient to prevent read noise present during the read operation (e.g., providing a sensing current) from impacting accuracy of the read operation. Thus, read noise generally does not affect accuracy of the determination of the state of the cell.

A multi-level-cell (MLC) architecture has multiple values, such as four binary values stored in each cell. In such an architecture, the charge placed on the floating gate can take more than two levels (charge or no charge). Thus, if the charge placed on the floating gate takes four levels, two bits of information can be stored into a single cell. The techniques described herein may be applied to either SLC or MLC architectures. That is, either type of cell may be forced to a random state by repeated programming, as will be described in more detail below, and in such state, the value in the cell randomly changes whether the charge in the cell represents a single binary value or multiple binary values. For simplicity of illustration, it will be assumed that that flash memory described hereafter is an SLC architecture, unless indicated otherwise, but it should be emphasized that similar techniques may be used to generate random numbers in MLC architectures.

It has been observed that read noise levels increase substantially when a cell of flash memory is repeatedly programmed or erased a sufficient number of times to cause the cell to enter a random state. During such repeated programming, the cell's binary bit value is repeatedly programmed to the same logic value. For example, a flash memory cell may be programmed when a reference voltage is provided so that its logic value is zero.

As noted above, in a flash memory cell operating normally, a read operation at the flash memory cell is performed, and after this programming, there may be sufficient margin between voltage values corresponding to logic state zero and logic state one that read noise does not affect read accuracy of the state for the flash cell. However, when the same cell is repeatedly programmed a sufficient number of times (e.g., 100-200 program operations), the cell may enter a random state, and read noise may be increased significantly. In this regard, the state of the cell read during a read operation may change from logic zero to logic one, even though the cell is actually programmed, and should read logic zero.

Figure 2:
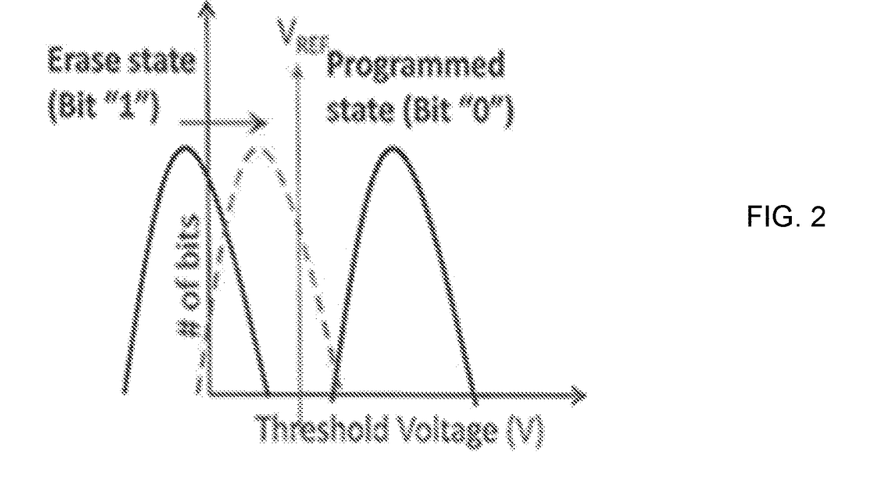
FIG. 2 is a graphical representation illustrating a programmed state and an erasable state voltage due to repetitive programming of flash memory cells.

It has further been observed that, when a cell is in a random state, margin between the threshold voltage for a cell reading "programmed" (logic zero) and threshold voltage for the cell's reading "erased" (logic one) may be reduced or eliminated, as can be seen in FIG. 2. Thus, programmed cells may show a bit value of logic one when a sensing voltage is applied. By setting all cells to an initial programmed value (e.g., logic zero), repeatedly programming the cells (e.g., 100-200 times), then monitoring cell values, cells in random state may be identified when their binary values unexpectedly change (e.g., to a logic one).

Figure 3:
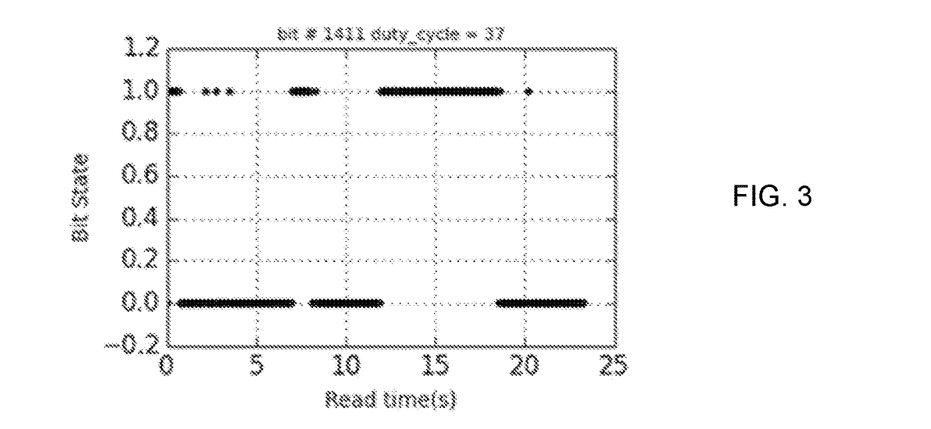
FIG. 3 is a graphical representation illustrating a bit state of a cell of the flash memory exhibiting a random state.

Note that read noise present in a cell may vary with time and at random levels. The read noise present in a flash memory cell in a random state may vary according to a statistical distribution. In this regard, read noise in such cell may vary randomly over time causing a read operation of the cell's binary bit value vary according to the associated statistical distribution. For example, read noise levels may vary so that the read noise present may be sufficient to affect the bit value read for the cell at various times, but insufficient to change the bit value at other times. This random variation in read noise results in random variations of bit values read from a cell in random state and may depend on the read time, as depicted by FIG. 3. In this regard, when a flash memory cell exhibits random changes in its stored bit value, the cell may fail to store correct bit value. This error or "fail" bit value may be indicative that the cell is in a random state. By setting bit values for cells of a page of data to a baseline bit value (e.g., logic zero or programmed state), cells in random state may be identified by noting cells that change logic values to logic one over periodic read operations. By the use of cells in a random state, the system described herein may generate a random number sequence that is truly random.

Figure 4:
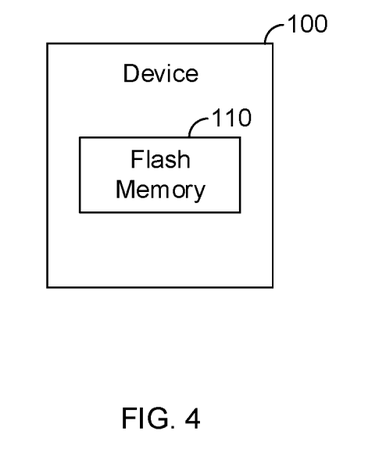
FIG. 4 is a block diagram illustrating an exemplary device with a flash memory.

FIG. 4 is a block diagram illustrating an exemplary device with a flash memory. The device 100 may comprise a memory unit 150 (FIG. 5) including a flash memory 110, and the device 100 may be programmed to facilitate generation of random numbers, as will be described in detail below. As an example, the device 100 may be used as a part of an IOT application, such as home automation system, and the random number sequence generated by the device 100 may be used to encrypt or decrypt information in the IOT system. However, the random numbers generated by the device 100 may be used for other purposes as may be desired.

The device 100 may include, but is not limited to, smartphones, mobile devices, tablets, personal digital assistants, personal computers or other devices, and the flash memory 110 may be a memory card, a Universal Service Bus flash drive, a solid state drive or other types of flash memory. In an exemplary embodiment, the flash memory 110 may be a multilevel cell NAND flash architecture, although in other embodiments other types of devices 100 and other types of flash memory 110 may be possible.

Figure 5:
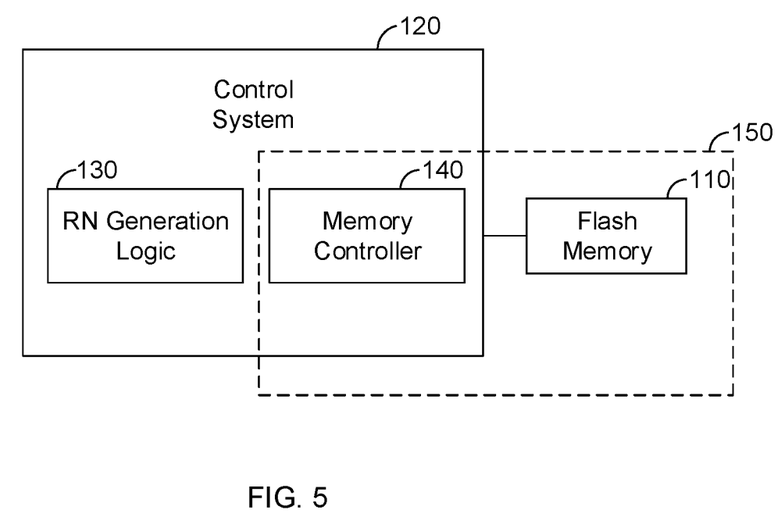
FIG. 5 is a block diagram illustrating a control system of the device depicted in FIG. 4.

FIG. 5 depicts a control system 120 of the device 100 that may be used to generate a number that is truly random. The control system 120 may be implemented exclusively in hardware (e.g., a field programmable gate array) or a combination of hardware, software, and/or firmware. In an exemplary embodiment, at least a portion of the control system 120 is implemented in software, and the control system 120 includes one or more processors for executing instructions of the software. The control system 120 may be configured to generate a random number from the flash memory 110 using repetitive programming of a block (e.g., page) of the flash memory 110. In this regard, the exemplary control system 120 may include a memory controller 140 configured to control the flash memory 110, and logic 130 (referred to hereinafter as "random number generation logic") may be configured to transmit instructions to the memory controller 140 for reading and writing to the flash memory 110 for use in generating a random number sequence, as will be described in detail later.

Figure 6:
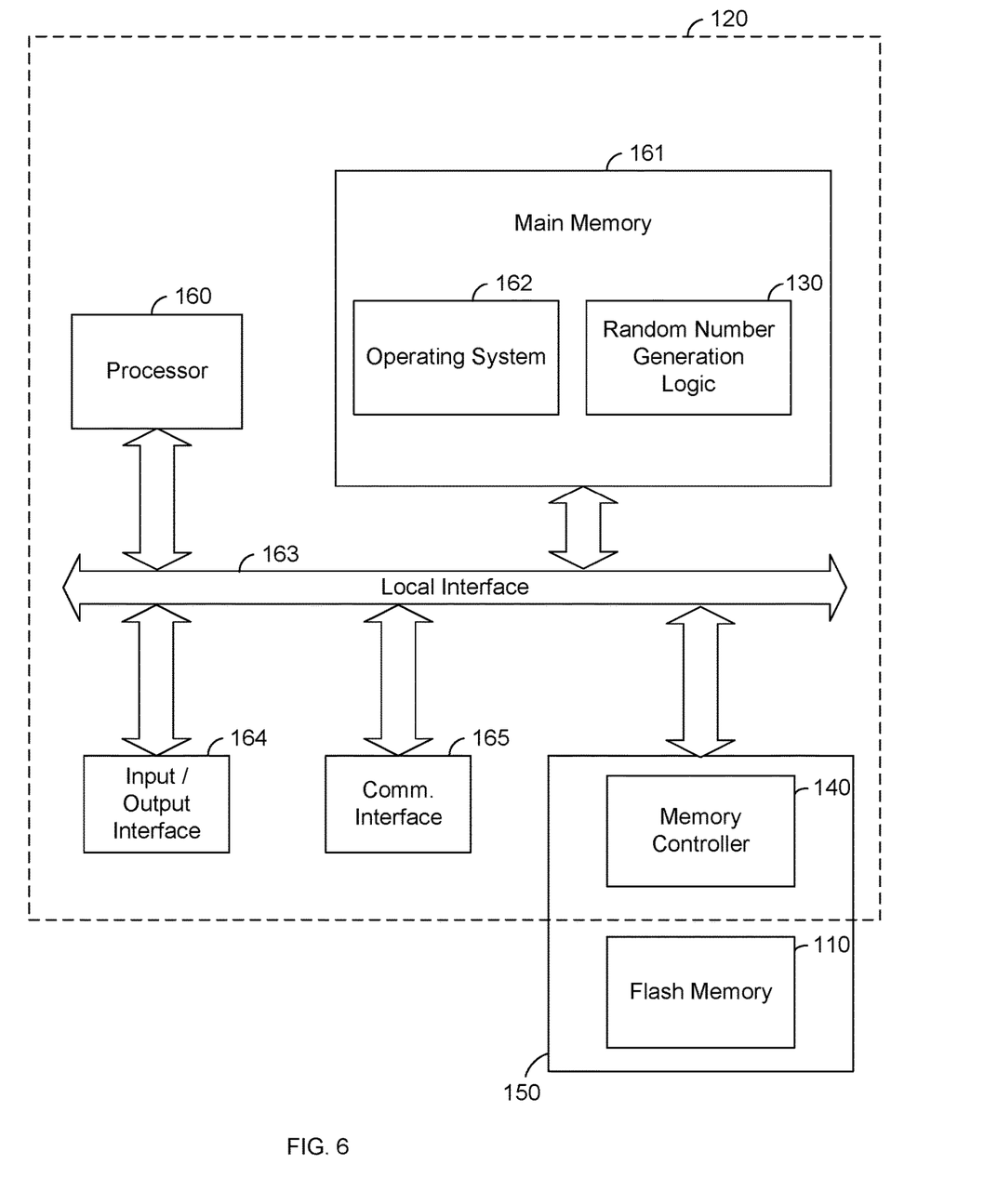
FIG. 6 is a block diagram illustrating a control system, such as is depicted by FIG. 5

FIG. 6 depicts an exemplary embodiment of the control system 120 in which the random number (RN) generation logic 130 is implemented in software and stored in memory (e.g., main memory 161) of the control system 120. As shown by FIG. 6, the control system 120 may further include at least one conventional processor 160. The processor may comprise processing hardware, e.g., central processing unit (CPU) or a digital signal processor (DSP), for executing instructions stored in memory 161. As an example, the RN generation logic 130 may be a software application downloaded into memory and run by the processor 160 to perform its functions as described in more detail herein. The processor 160 communicates to and drives other elements within the system 120 via a local interface 163, which can include at least one bus. The control system 120 also includes an input/output (I/O) interface 164 configured to receive inputs and provide outputs. In an exemplary embodiment, the I/O interface 164 may comprise a keyboard, keypad, or mouse to receive user inputs and a display device, such a liquid crystal display (LCD), to provide outputs to a user. In some embodiments, the I/O interface may comprise a touchscreen or other device capable of both receiving inputs via capacitive sensing or otherwise and displaying outputs. Other types of input and/or output devices are possible in other embodiments.

The control system 120 may also include a communication interface 165, such as a cellular radio, for communicating data with external devices. In particular, the communication interface 165 may be configured to use a random number sequence from the RN generation logic 130 for encryption or decryption of data communicated by the interface 165. In other embodiments, other uses of the random number sequence are possible.

The control system 120 of the device 100 may include a conventional operating system 162 stored in the memory 161. Such operating system 162 may be configured to manage the hardware and software resources of the device 100 using techniques known in the art.

The device 100 further includes a memory unit 150 that includes the memory controller 140 and the flash memory 110. In an exemplary embodiment, the memory unit 150 may be internal to the device 100, such as a removable flash memory card inserted into the device 100 or flash memory permanently integrated into the device 100 during manufacturing. In some embodiments, the memory unit 150 may be externally connected to the device 110. As an example, the memory unit 150 may be a universal service bus flash drive ("USB flash drive") externally connected to the device 110. In other embodiments, other configurations of the memory unit 150 are possible.

As noted above, the memory controller 140 may be configured to control the flash memory 110. For example, the memory controller 140 may be responsive to instructions from other components, such as RN generation logic 130, for performing various tasks such as read, write, erase, or other operations on the flash memory 110. Further, the memory controller 140 may be configured to control access to the flash memory 110 and may allocate space (e.g., blocks) of the flash memory 110 to other resources of the device 100, such as applications (e.g., the RN generation logic 130) stored in memory 161. The memory controller 140 may be implemented in hardware or a combination of hardware, software, and/or firmware. As an example, the memory controller 140 may comprise one or more processors programmed with instructions for performing its functions as described in more detail herein.

The RN generation logic 130 may be implemented in hardware, software, firmware or any combination thereof. In the exemplary control system 120, illustrated by FIGS. 5 and 6, the random number generation logic 130 is implemented in software and stored in memory 161, as described above. Note that the RN generation logic 130, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

As noted earlier, the RN generation logic 130 may be configured to generate random numbers from the flash memory 110. In this regard, the RN generation logic 130 may transmit instructions to the memory controller 140 for repetitively programming a block of the flash memory 110 with the same number sequence to force cells of the flash memory 110 to a random state. The RN generation logic 130 may also transmit instructions to the memory controller 140 for reading the values in the block of flash memory 110. The RN generation logic 130 then analyzes the values read by the memory controller 140 and returned to the RN generation logic 130 to determine which of the cells have been forced to a random state. Based on random values read from such cells, the RN generation logic 130 generates a random number sequence. Exemplary techniques for generating such a random number sequence will be described in more detail below.

In this regard, the RN generation logic 130 may initially request from the operating system 162 allocation of a block of flash memory 110 to be used for random number generation. Through such allocation, other resources of the device 100 may be prevented from accessing the block of flash memory 110 and interfering with the random number generation process.

After allocation of the block of flash memory 110 to the RN generation logic 130, the logic 130 may instruct the memory controller 140 to erase the allocated block of flash memory 110. The RN generation logic 130 may be configured to then write a number sequence on the erased memory block for a desired number of times (indicated as 'N') (e.g., between 100 and 200 times or otherwise) in order to force at least some of the cells of the memory block into a random state. In this regard, the RN generation logic 130 may submit to the memory controller 140 N number of consecutive write requests having the same memory address and same value to be written, and in response the memory controller 140 may perform the requested write operations. Thus, the same number sequence may be written to the same block of flash memory 110. As an example, the block may be programmed using an alternate pattern of programed cells and erased cells (i.e., logic 0-1-0-1-0-1 . . . ) or "checker board" pattern, and repeated for N times. By performing the write operations, the same logic value may be written repeatedly to each cell for N times. In other embodiments, a different programming pattern may be used for the memory block.

As mentioned earlier, due to this repeated programming of the block of flash memory 110, a plurality of cells in the block may enter a "random state" such that the values stored in such cells (referred to hereinafter as "failed bits") may change randomly or fluctuate over time. The RN generation logic 130 is configured to identify the failed bits (i.e., the cells that have entered a random state and thus have values that change over time). In this regard, the RN generation logic 130 may be configured to read the block of flash memory 110 by submitting one or more read quests to the memory controller 140, which then retrieves the values stored in the memory cells and returns those values to the RN generation logic 130. The RN generation logic 130 then compares the values read from the block of flash memory 110 to the number sequence previously written to the block to determine which values have changed. The RN generation logic 130 may do this read and compare multiple times, and any cell that provides a value that has changed for any of the reads relative to the value previously written to it may be identified as having a failed bit (i.e., the cell has entered a random state).

In some embodiments, the RN generation logic 130 may be configured to determine a fail bit count, indicative of the number of the cells in the memory block that have been identified as entering a random state after programming of the cells for N times. The RN generation logic 130 may be configured to compare the fail bit count to a threshold. Such threshold may be established to ensure that a minimum length of random bits, as may be desired, are provided by a read operation for the block of flash memory 110. In this regard, if the fail bit count is less than the threshold, then the RN generation logic 130 may be configured to continue writing the same number sequence (relative to the number sequence previously written, as described above) to the block of flash memory 110 until the failed bit count exceeds the threshold value, thereby ensuring that a minimum number of cells have been forced to a random state.

After the failed bit count exceeds the threshold value, the RN generation logic 130 may be configured to generate a random number sequence using the failed bits. In this regard, the RN generation logic 130 may be configured to take bit values read from the cells identified as having entered a random state and combine (e.g., concatenate) these bit values into a random number sequence defining a value that is truly random. If desired, the RN generation logic 130 may be configured to perform one or more other operations such as applying debasing algorithms to a string of random bits to ensure that the string has a substantially equal number of logic 0's relative to logic 1's. However, such additional processing is unnecessary.

In some embodiments, the random number generation logic 130 may be configured to read the programmed block of the flash memory 110 multiple times in order to generate a random number sequence of desired bit length (indicated by 'x'). That is, for each read operation, the RN generation logic 130 obtains additional random bits that may be combined (e.g., concatenated) with random bits from previous read operations to increase the bit length of the random number sequence being generated. The RN generation logic 130 may continue adding random bits until the desired bit length is achieved.

Note that, for cells that have entered a random state, read noise can cause the value in the cell to change in a random manner in response to performance of the read operation. Thus, when a failed bit is read, noise from the read operation may change the bit value helping to improve the randomness of the random number sequence being generated. If desired, the RN generation logic 130 may identify a cell as entering a random state when the value read from the cell changes from one read operation to another regardless of the value originally written to the cell. In addition, it should be emphasized that the process described above is exemplary, and other techniques may be used to generate a random number sequence from cells that have been forced to a random state by repetitive write operations.

Once a random number sequence of a desired bit length is achieved, it may be used for any purpose as may be desired. As an example, the RN generation logic 130 may provide the random number sequence to communication interface 165 (FIG. 6), which may use the random number sequence in an encryption or decryption algorithm. Other uses of the random number sequence are also possible.

Figure 7:
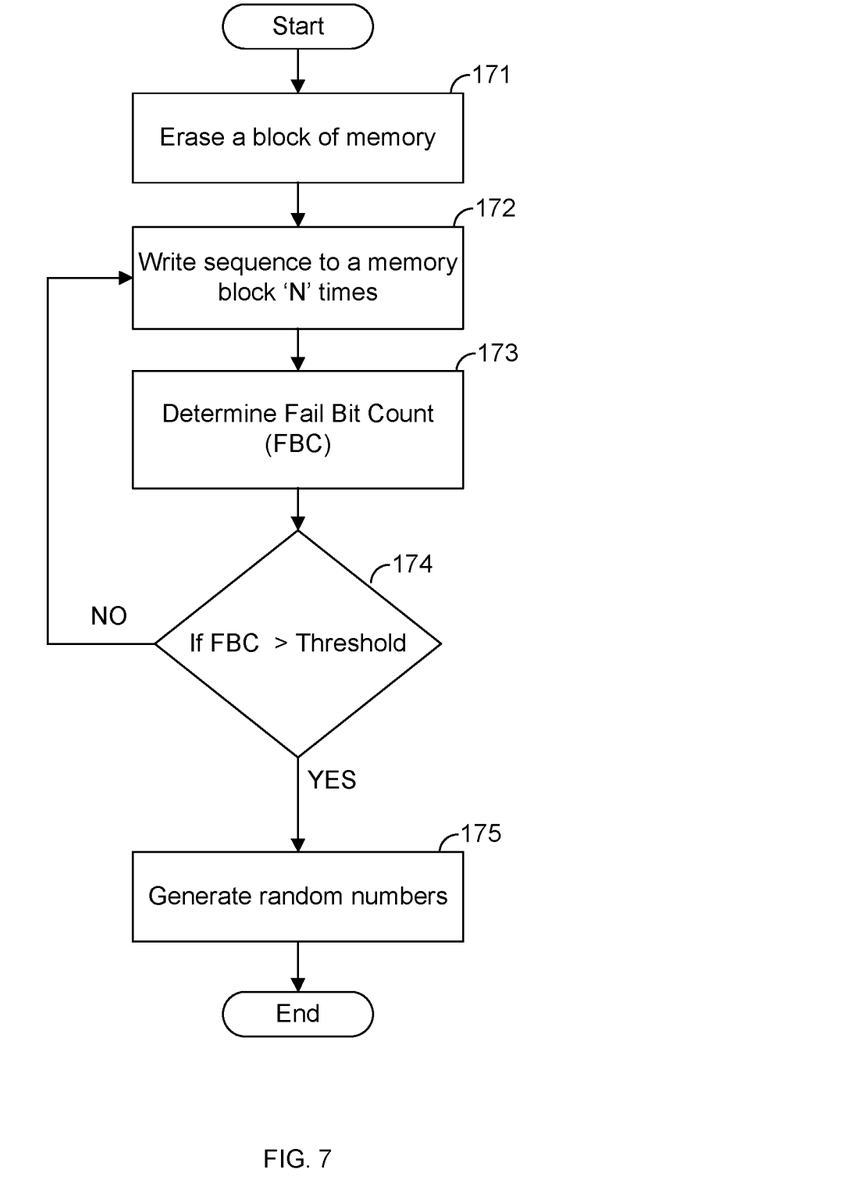
FIG. 7 is a flowchart illustrating an exemplary operation of a random number generation logic.

FIG. 7 depicts an exemplary operation of the RN generation logic 130. As an example, assume that the device 100 is a conventional cellphone having flash memory 110. Such cellphone can be configured to generate a random number sequence by downloading the RN generation logic 130 into memory 161. In this regard, the RN generation logic 130 may be a software application that is downloaded into the cellphone to provide random number generation without having to change the hardware resources of the cellphone.

During operation, the RN generation logic 130 may transmit a request to the operation system 162 to allocate a space (e.g., a block) in the memory 110 for performing tasks related to the generation of random number sequence. In response, the operating system 162 may allocate a block of memory 110 to the RN generation logic 130. The RN generation logic 130 may then erase the block of the flash memory 110 of the device, as shown by block 171 of FIG. 7. Then, the logic 130 may write a sequence to the block N times, as shown by block 172 of FIG. 7, such as between about 100 to 200 times. In the depicted embodiment, the logic 130 may repeatedly program the block of the flash memory 110 using a checker board pattern such that the cells are repetitively programmed to an alternating pattern of programmed state and erased state (e.g., logic 0-1-0-1 . . . ). Due to the repetitive programming of the block, various cells of the memory block may be forced to random states.

After writing the same sequence N times, the random number generation logic 130 determines the fail bit count indicative of the number of cells that have entered a random state due to repetitive programming, as shown by block 173 of FIG. 7. In this process, the logic 130 reads the cells of the block and identifies the cells storing a value that has changed from its respective initial programmed value. The logic 130 may read the cells multiple times and a identify cell as having entered a random state if its value has changed for any of the reads. That is, a cell not in a random state should continuously store the same value originally programmed into it by the write operations.

After determining the fail bit count, the logic 130 checks if the fail bit count is greater than a predefined threshold, as shown by block 174 of FIG. 7. If the fail bit count exceeds threshold value, the RN generation logic 130 generates a random number sequence using the values from the cells that have been identified as in a random state, as shown by block 175 of FIG. 7.

On the other hand, if the fail bit count does not exceed the threshold, the logic 130 performs blocks 172-174 again until the fail bit count exceeds the threshold value and the RN generation logic 130 may then proceed to generate random numbers in block 175.

Figure 8:
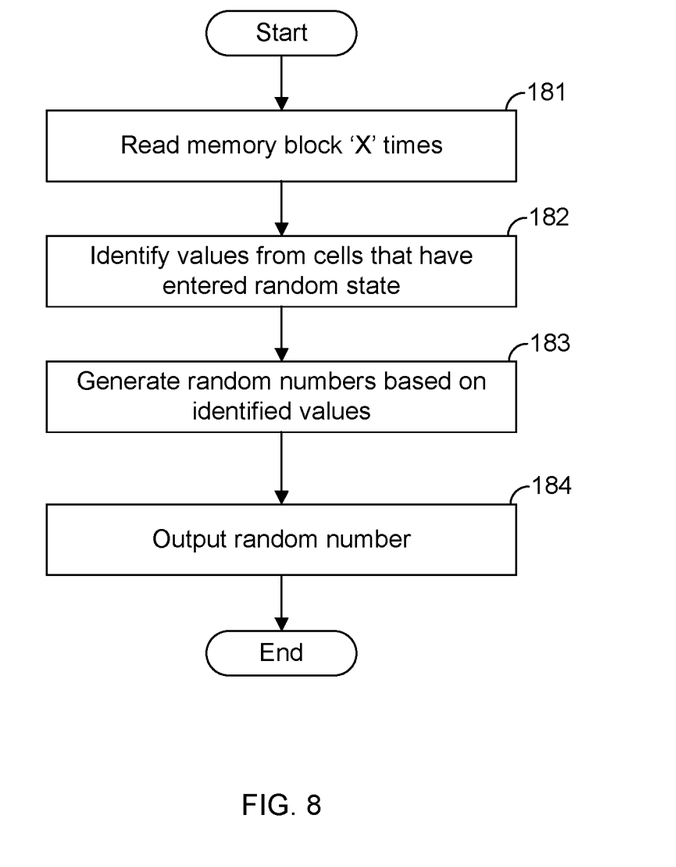
FIG. 8 is a flowchart illustrating an exemplary operation of the random number generation logic.

FIG. 8 depicts an exemplary operation of the RN generation logic 130 to generate a random number, such as in block 175 of FIG. 7. The RN generation logic 130 reads the aforementioned repetitively programmed memory block for 'x' times, as shown by block 181. As an example, x could be any number between 10 and 100 or some other number as may be desired. Further, the RN generation logic 130 identifies values from cells that have entered a random state, as shown by block 182. In this regard, after reading the memory block for x times, the RN generation logic 130 discards bits that do not change across the read operations.

Then, using the remaining identified values, which are from cells having entered a random state, the RN generation logic 130 may generate one or more random numbers, as shown by block 183 of FIG. 8. In this regard, the random values read from the cells identified as having entered a random state may be combined to form a random number sequence of a desired bit length. If additional random bits are needed to satisfy the desired bit length, then additional read operations may be performed. If desired, the RN generation logic 130 may convert the random number from binary to decimal or some other format.

Once a random number is generated, the RN generation logic 130 may output the generated random number, as shown by block 184 of FIG. 8, for use as may be desired, such as by another application in the cellphone or by the communication interface 165.

Accordingly, the system described herein is able to leverage the randomness of the flash memory through repeated programming to provide a number that is truly random. In this regard, existing hardware of devices, like cellphones, may be retrofitted with random number generation functionality in order to generate random numbers that are truly random by simply downloading and running the RN generation logic 130 without having to modify the hardware resources of the devices. That is, true random number generation may be provided without having to add expensive or bulky hardware. Thus, the overall cost to provide random number generation can be reduced or mitigated while achieving a robust algorithm for generating a number that is truly random.

The invention claimed is:

1. A random number generation system, comprising:
  flash memory; and
  a control system configured to consecutively program a value associated with an erased state to a cell of the flash memory a sufficient number of times to force the cell to a random state, the control system further configured to generate a random number based on a value read from the cell while the cell is in the random state.

2. The random number generation system of claim 1, wherein the control system is configured to analyze values read from the cell to determine whether the cell is in the random state.

3. A random number generation system, comprising:
  flash memory; and
  a controller configured to consecutively program a value associated with an erased state to each of a plurality of cells of a block of the flash memory a sufficient number of times to force at least some of the plurality of cells to a random state, the controller further configured to analyze values read from the block to identify which of the read values are from the plurality of cells in the random state and to generate a random number based on the identified values.

4. The random number generation system of claim 3, wherein the controller is configured to determine a value indicative of a number of the plurality of cells forced to the random state and compare the value to a threshold.

5. The random number generation system of claim 4, wherein the controller is configured to generate the random number in response to a comparison of the threshold to the value indicative of the number of the plurality of cells forced to the random state.

6. A random number generation method, comprising:
  consecutively programming a value associated with an erased state to each of a plurality of cells of a block of flash memory, thereby forcing at least some of the plurality of cells into a random state;
  reading values from the plurality of cells; and
  generating a random number based on the read values.

7. The method of claim 6, further comprising:
  determining a value indicative of a number of the plurality of cells in the random state; and
  comparing a threshold to the value indicative of the number of the plurality of cells in the random state.

8. The method of claim 6, further comprising analyzing values read from the block, and identifying based on the analyzing which of the values read from the block are from the plurality of cells in the random state, wherein the generating is based on the identifying.

9. A random number generation method, comprising:
  consecutively programming a value associated with an erased state to a cell of flash memory a sufficient number of times to force the cell to a random state;
  reading, with a controller, a value from the cell while the cell is in the random state; and
  generating a random number based on the read value.

\* \* \* \* \*